United States Patent
Measom et al.

(10) Patent No.: US 8,166,742 B2
(45) Date of Patent: *May 1, 2012

(54) UNCURED COMPOSITE ROPE INCLUDING A PLURALITY OF DIFFERENT FIBER MATERIALS

(75) Inventors: Ronald J. Measom, Hurst, TX (US); Frank Bradley Stamps, Colleyville, TX (US); Pat Tisdale, Roanoke, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/919,038

(22) PCT Filed: Feb. 28, 2008

(86) PCT No.: PCT/US2008/055342
§ 371 (c)(1),
(2), (4) Date: Aug. 24, 2010

(87) PCT Pub. No.: WO2009/108200
PCT Pub. Date: Sep. 3, 2009

(65) Prior Publication Data
US 2011/0003150 A1    Jan. 6, 2011

(51) Int. Cl.
*D02G 3/02* (2006.01)
(52) U.S. Cl. .......................................... 57/232

(58) Field of Classification Search .............. 57/367, 57/375, 391, 394, 232, 236, 237, 238, 241; 428/367, 375, 391, 394
See application file for complete search history.

(56) References Cited

U.S. PATENT DOCUMENTS

| | | | |
|---|---|---|---|
| 4,677,818 A | | 7/1987 | Honda et al. |
| 4,818,613 A | * | 4/1989 | Ohtani et al. ................. 428/396 |
| 4,871,491 A | * | 10/1989 | McMahon et al. ........... 264/29.2 |
| 4,874,563 A | * | 10/1989 | McMahon et al. ........... 264/29.2 |
| 5,503,928 A | * | 4/1996 | Cheshire ....................... 428/357 |
| 6,045,906 A | * | 4/2000 | McMahon et al. ........... 428/364 |
| 2002/0157765 A1 | * | 10/2002 | Takeuchi et al. ............. 156/157 |
| 2006/0083923 A1 | | 4/2006 | Abe et al. |
| 2011/0000179 A1 | * | 1/2011 | Measom et al. ................ 57/237 |

OTHER PUBLICATIONS

First Office Action from CN counterpart Application No. 200880127695.2, issued by the Patent Office of China on Sep. 26, 2011.

* cited by examiner

*Primary Examiner* — Shaun R Hurley
(74) *Attorney, Agent, or Firm* — James E. Walton; Richard G. Eldredge

(57) ABSTRACT

An uncured, composite rope includes at least one inner tow of structural fibers of a first material and a plurality of outer tows of structural fibers disposed about the at least one inner tow, the structural fibers of at least one of the plurality of outer tows being made from a second material that is different from the first material. The uncured, composite rope further includes an uncured polymeric resin impregnated into the at least one inner tow and the plurality of outer tows.

17 Claims, 2 Drawing Sheets

UNCURED COMPOSITE ROPE INCLUDING A PLURALITY OF DIFFERENT FIBER MATERIALS

TECHNICAL FIELD

The present invention relates to fiber-reinforced, composite materials.

DESCRIPTION OF THE PRIOR ART

One particular class of fiber-reinforced, composite materials includes narrow, flat tape materials comprising a plurality of substantially parallel, structural fibers that are impregnated with an uncured polymeric resin, known as a "prepreg tape." Such tape materials are assembled or "laid-up" into plies, often using automated fiber placement processes, to form uncured, composite assemblies that are subsequently consolidated and cured, typically using heat and pressure, to form fiber-reinforced, composite workpieces. These tape materials typically exhibit generally rectangular cross-sections having large width-to-thickness aspect ratios.

It is often desirable to have different types of structural fibers in a composite workpiece. For example, it is often advantageous to include graphite fibers and glass fibers in a workpiece so that the workpiece is both strong and has sufficient fracture toughness. Conventionally, such workpieces are constructed by laying up composite plies containing graphite fibers with additional plies or partial plies containing glass fibers. When using automated fiber placement equipment, however, only one type of fibers, e.g., either graphite fibers or glass fibers, can be applied at any one time. To change fiber types, all of the composite prepreg material feeding the automated fiber placement equipment must be changed out, which both time consuming and laborious. Alternatively, one type of material remains loaded in the automated fiber placement machine and material containing the other type of material is hand laid-up onto the fiber-placed workpiece, which prevents full utilization of expensive automated fiber placement equipment.

There are many designs of resin-impregnated, structural fiber forms well known in the art; however, considerable shortcomings remain.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
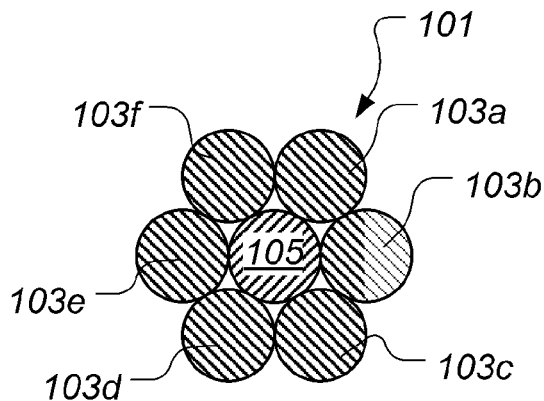
FIG. 1 depicts a stylized, cross-sectional view of a first illustrative embodiment of an uncured, composite rope including a plurality of different fiber materials.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

An uncured, composite rope including a plurality of different fiber materials is disclosed. The rope comprises a plurality of outer tows disposed about one or more inner tows. At least one of the outer tows comprises a fiber material that is different from the fiber material of at least one of the inner tows. In one embodiment, an inner tow of the rope comprises a graphite fiber material and the outer tows comprise a glass fiber material. Other combinations of materials are contemplated by the present invention. The rope can be applied using conventional, automated fiber placement equipment. Different materials can, thus, be combined in a precise manner and deposited in a single operation. Use of the uncured, composite rope results in stronger, lighter, tougher composite parts than are conventionally possible.

FIG. 1 depicts a stylized, cross-sectional view of an uncured, composite rope 101. Rope 101 comprises a plurality of outer tows 103a-103f disposed about one or more inner tows 105. Each of tows 103a-103f and 105 comprises a bundle of twisted or untwisted structural fibers. Examples of such structural fibers include, but are not limited to, carbon fibers, graphite fibers, glass fibers, aramid fibers, and the like. In the illustrated embodiment, only one inner tow 105 is depicted; however, the present invention contemplates a plurality of inner tows. Tows 103a-103f and 105 are impregnated with an uncured polymeric material. Examples of such a material include, but are not limited to, a thermoplastic polymer, a thermosetting polymer, a liquid crystal polymer, an epoxy polymer, a polyamide-imide polymer, a polyaryletherketone polymer, a polyetheretherketone polymer, a polyimide polymer, a polyphenylene sulfide polymer, a polyester polymer, a vinyl ester polymer, and the like.

In the illustrated embodiment, outer tows 103a-103f comprise structural fibers that are different in composition than the structural fibers of inner tow 105. For example, in one particular embodiment, outer tows 103a-103f comprise glass fibers, while inner tow 105 comprises graphite fibers. Other configurations, however, are contemplated by the present invention. For example, in an alternative embodiment, outer tows 103a-103f comprise graphite fibers, while inner tow 105 comprises glass fibers. The particular types of fibers for tows 103a-103f and 105 are implementation specific. Any combination of fiber materials that is suitable for a particular implementation may be used in tows 103a-103f and 105.

Figure 2:
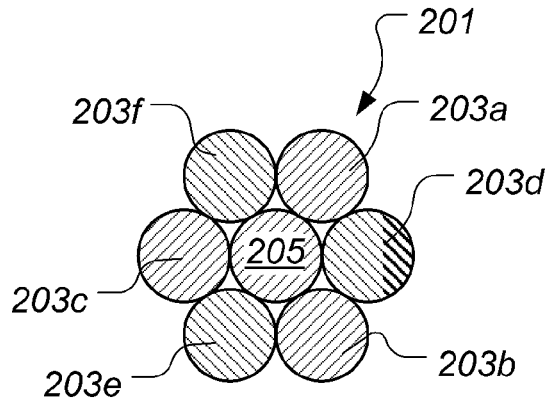
FIG. 2 depicts a stylized, cross-sectional view of a second illustrative embodiment of an uncured, composite rope including a plurality of different fiber materials.

It may be desirable in certain implementations for one or more of the outer tows to comprise the same fiber material as the inner tow or tows. Accordingly, FIG. 2 depicts a stylized, cross-sectional view of an uncured, composite rope 201. Rope 201 comprises a plurality of outer tows 203a-203f disposed about one or more inner tows 205. Outer tows 103a-103c comprise substantially the same fiber material as inner tow 105, while outer tows 103d-103f comprise a fiber material that is different from inner tow 105. Other aspects of rope 201 generally correspond to rope 101.

Figure 3:
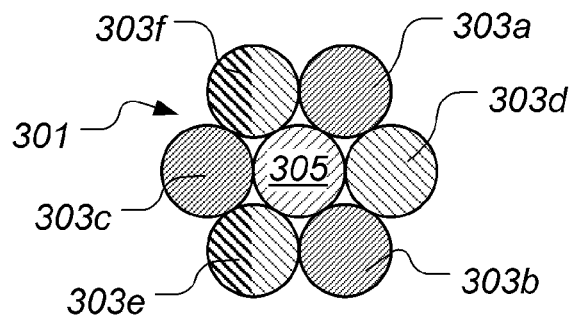
FIG. 3 depicts a stylized, cross-sectional view of a third illustrative embodiment of an uncured, composite rope including a plurality of different fiber materials.

In other implementations, it may be desirable for one or more of the outer tows to comprise a fiber material that is different from either the other outer tows or the inner tow or tows. Accordingly, FIG. 3 depicts a stylized, cross-sectional view of an uncured, composite rope 301. Rope 301 comprises a plurality of outer tows 303a-303f disposed about one or more inner tows 305. Outer tows 303a-303c comprise a different fiber material than inner tow 105 and outer tows 303d-303f comprise a fiber material that is different from either outer tows 303a-303c or inner tow 305. Other aspects of rope 301 generally correspond to rope 101.

It should be noted that any number of different materials may be combined in an uncured, composite rope. For example, an uncured, composite rope may include two inner tows that comprise different fiber materials. In another example, an uncured, composite rope may include more than two different fiber materials in the outer tows. The scope of the present invention is not limited by the number of inner tows, the number of outer tows, or the particular combination or number of fiber materials used in the uncured, composite rope.

Ropes 101, 201, and 301 comprise outer tows, i.e., tows 103a-103f, 203a-203f, and 303a-303f, respectively, that are substantially the same diameter in cross section as the one or more inner tows, i.e., tows 105, 205, and 305, respectively. The scope of the present invention, however, is not so limited. Rather, the outer tows may be larger or smaller in cross-sectional diameter than the one or more inner tows.

Figure 4:
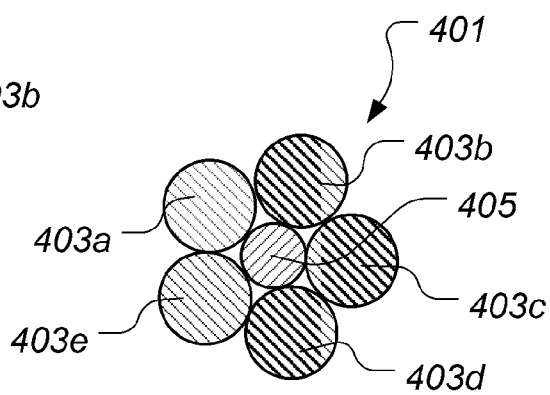
FIG. 4 depicts a stylized, cross-sectional view of a fourth illustrative embodiment of an uncured, composite rope including a plurality of different fiber materials.

For example, FIG. 4 depicts a stylized, cross-sectional view of an uncured, composite rope 401. Rope 401 comprises a plurality of outer tows 403a-403e disposed about one or more inner tows 405. In the illustrated embodiment, outer tows 403a-403e are larger in cross-sectional diameter than inner tow 405. Other aspects of rope 201 generally correspond to rope 101, except that different materials may be used in tows 403a-403e and 405, as discussed above concerning ropes 201 and 301.

Figure 5:
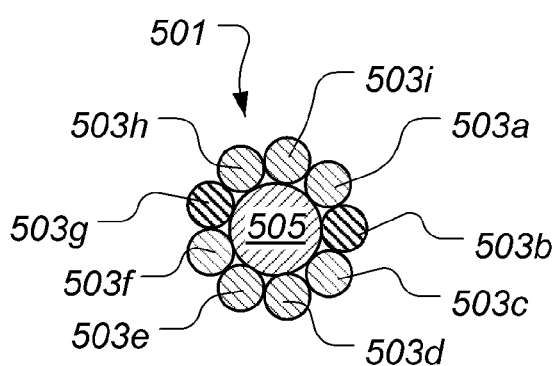
FIG. 5 depicts a stylized, cross-sectional view of a fifth illustrative embodiment of an uncured, composite rope including a plurality of different fiber materials.

FIG. 5 depicts a stylized, cross-sectional view of an uncured, composite rope 501. Rope 501 comprises a plurality of outer tows 503a-503i disposed about one or more inner tows 505. In the illustrated embodiment, outer tows 503a-503i are smaller in cross-sectional diameter than inner tow 505. Other aspects of rope 201 generally correspond to rope 101, except that different materials may be used in tows 503a-503i and 505, as discussed above concerning ropes 201 and 301.

Figure 6:
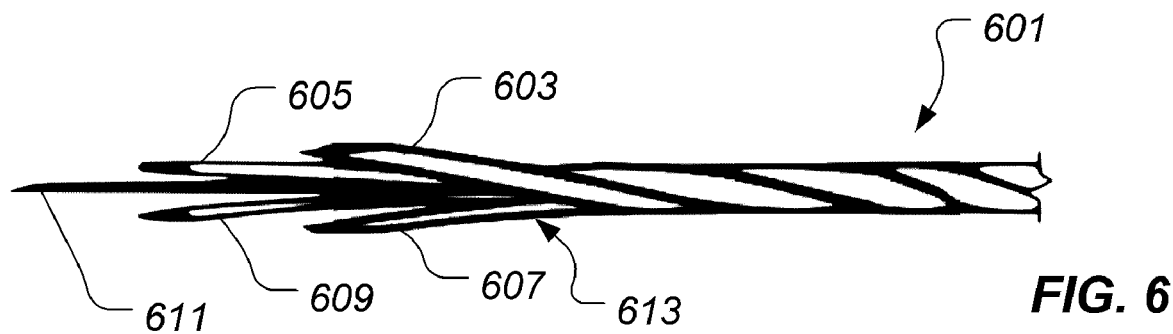
FIG. 6 depicts a stylized, side, elevational view of an illustrative embodiment of a twisted, uncured, composite rope including a plurality of different fiber materials.

As discussed herein, the outer tows of the uncured, composite rope are disposed about one or more inner tows. Preferably, the outer tows are twisted, braided, or plaited about the one or more inner tows. For example, FIG. 6 depicts a stylized, side, elevational view of an uncured, composite rope 601. In the illustrated embodiment, rope 601 comprises a plurality of outer tows 603, 605, 607, and 609 and one or more inner tows 611. It should be noted that and end 613 of rope 601 is splayed to better reveal tows 603, 605, 607, 609, and 611. Each of tows 603, 605, 607, 609, and 611 comprises a bundle of twisted or untwisted structural fibers. At least one of outer tows 603, 605, 607, 609, and 611 comprises a different fiber material than inner tow 611. In the illustrated embodiment, rope 601 is formed by twisting outer tows 603, 605, 607, and 609 about inner tow 611.

In one embodiment, at least tows 603, 605, 607, and 609 are individually twisted in a direction opposite the twist of rope 601 to help retain rope 601 in a twisted configuration. For example, if rope 601 is a right-hand twisted rope, then, in such an embodiment, tows 603, 605, 607, and 609 are left-hand twisted tows. Conversely, in such an embodiment, if rope 601 is a left-hand twisted rope, then tows 603, 605, 607, and 609 are right-hand twisted tows. Uncured resin that is impregnated into tows 603, 605, 607, 609, and 611 further aids in retaining rope 601 in a twisted configuration.

It should be noted that any combination of fiber materials that is suitable for a particular implementation may be used in tows 603, 605, 607, 609, and 611. For example, rope 601 may have a configuration corresponding to any of ropes 101, 201, 301, 401, or 501.

Figure 7:
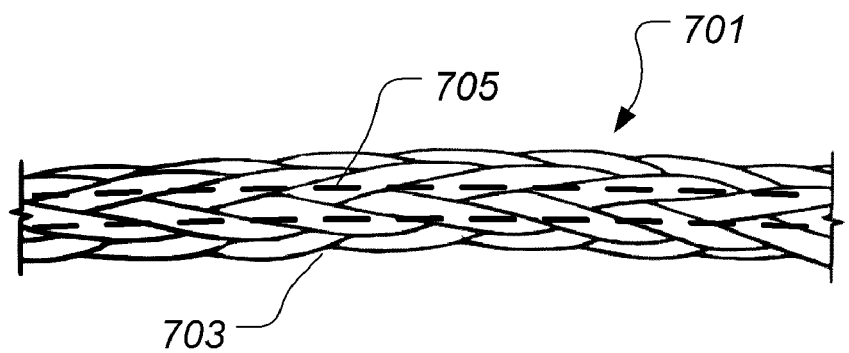
FIG. 7 depicts a stylized, side, elevational view of an illustrative embodiment of a braided, uncured, composite rope including a plurality of different fiber materials.

Rope 601 has a twisted form. The scope of the present invention, however, is not so limited. Rather, an uncured, composite rope may comprise a plurality of tows that has a woven or braided configuration. For example, FIG. 7 depicts a stylized, side, elevational view of a third illustrative embodiment of an uncured, composite rope 701. In the illustrated embodiment, rope 701 comprises a plurality of outer tows, such as tow 703, and one or more inner tows, such as tow 705. Each of the tows comprises a bundle of twisted or untwisted structural fibers. Preferably, each of the tows comprises a bundle of untwisted structural fibers.

It should be noted that any combination of fiber materials that is suitable for a particular implementation may be used in the outer tows, such as outer tow 703, and the one or more inner tows, such as inner tow 705. For example, rope 701 may have a configuration corresponding to any of ropes 101, 201, 301, 401, or 501.

Figure 8:
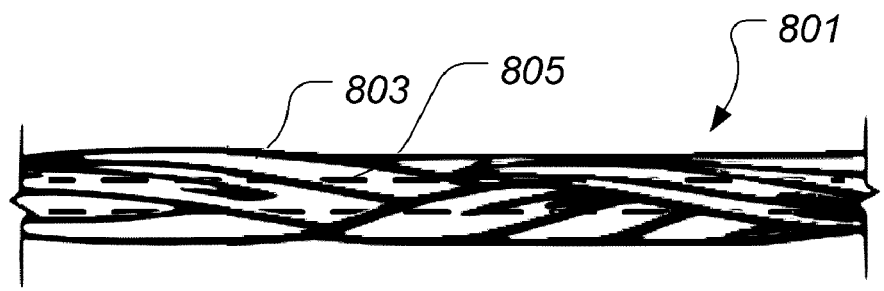
FIG. 8 depicts a stylized, side, elevational view of an illustrative embodiment of a plaited, uncured, composite rope including a plurality of different fiber materials.

Woven or braided forms other than that shown in FIG. 7 are contemplated by the present invention. For example, FIG. 8 depicts a stylized, side, elevational view of a fourth illustrative embodiment of an uncured, composite rope 801. In the illustrated embodiment, rope 801 comprises a plurality of outer tows, such as an outer tow 803, and one or more inner tows, such as an inner tow 805. Each of the tows comprises a bundle of twisted or untwisted structural fibers. Preferably, each of the tows comprises a bundle of untwisted structural fibers. Rope 801 is formed by plaiting the tows.

Resin-impregnated, structural fiber ropes 101, 201, 301, 401, 501, 601, 701, and 801 are generally round in cross-section, although other cross-sectional shapes are contemplated by the present invention. For example, a resin-impregnated, structural fiber rope may have a cross-sectional shape that is generally oval, rounded rectangular, or the like. In one particular embodiment, ropes 101, 201, 301, and 401 exhibit generally round cross-sectional shapes having diameters less than about 2 millimeters. In another embodiment, ropes 101, 201, 301, and 401 exhibit generally round cross-sectional shapes having diameters within a range of about 0.7 millimeters to about 1.6 millimeters.

The present invention provides significant advantages, including: (1) the ability to deposit different materials in a single automated fiber placement operation; and (2) the ability to produce stronger, lighter, tougher composite parts than conventionally possible.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. An uncured, composite rope, comprising:
    at least one inner tow of structural fibers of a first material;
    a plurality of outer tows of structural fibers disposed about the at least one inner tow, the structural fibers of at least one of the plurality of outer tows being made from a second material that is different from the first material; and
    an uncured polymeric resin impregnated into the at least one inner tow and the plurality of outer tows.

2. The uncured, composite rope, according to claim 1, wherein the structural fibers of the inner tow comprise:
    a graphite or carbon fiber material.

3. The uncured, composite rope, according to claim 1, wherein the structural fibers of the outer tows comprise:
    a glass fiber material.

4. The uncured, composite rope, according to claim 1, wherein the structural fibers of the at least one inner tow are selected from the group consisting of carbon fibers, graphite fibers, glass fibers, and aramid fibers.

5. The uncured, composite rope, according to claim 1, wherein the structural fibers of the plurality of outer tows are selected from the group consisting of carbon fibers, graphite fibers, glass fibers, and aramid fibers.

6. The uncured, composite rope, according to claim 1, wherein the uncured polymeric resin is selected from the group consisting of a thermoplastic polymer, a thermosetting polymer, and a liquid crystal polymer.

7. The uncured, composite rope, according to claim 1, wherein the uncured polymeric resin is selected from the group consisting of an epoxy polymer, a polyamide-imide polymer, a polyaryletherketone polymer, a polyetheretherketone polymer, a polyimide polymer, a polyphenylene sulfide polymer, a polyester polymer, and a vinyl ester polymer.

8. The uncured, composite rope, according to claim 1, wherein at least one of the outer tows comprises the same material as the at least one inner tow.

9. The uncured, composite rope, according to claim 1, wherein the at least one inner tow and each of the plurality of outer tows exhibit substantially the same cross-sectional diameters.

10. The uncured, composite rope, according to claim 1, wherein at least one of the plurality of outer tows exhibits a larger cross-sectional diameter than the at least one inner tow.

11. The uncured, composite rope, according to claim 1, wherein at least one of the plurality of outer tows exhibits a smaller cross-sectional diameter than the at least one inner tow.

12. The uncured, composite rope, according to claim 1, wherein the plurality of outer tows are twisted about the at least one inner tow.

13. The uncured, composite rope, according to claim 1, wherein the plurality of outer tows are braided about the at least one inner tow.

14. The uncured, composite rope, according to claim 1, wherein the plurality of outer tows are plaited about the at least one inner tow.

15. The uncured, composite rope, according to claim 1, wherein the rope exhibits a generally round shape in cross-section.

16. The uncured, composite rope, according to claim 1, wherein the rope exhibits a diameter of less than about 2 millimeters.

17. The uncured, composite rope, according to claim 1, wherein the rope exhibits a diameter within a range of about 0.7 millimeters to about 1.6 millimeters.

* * * * *